Aug. 1, 1933. H. PETERSEN 1,920,431
DRUM CONTROLLER
Filed Dec. 26, 1930 2 Sheets-Sheet 1
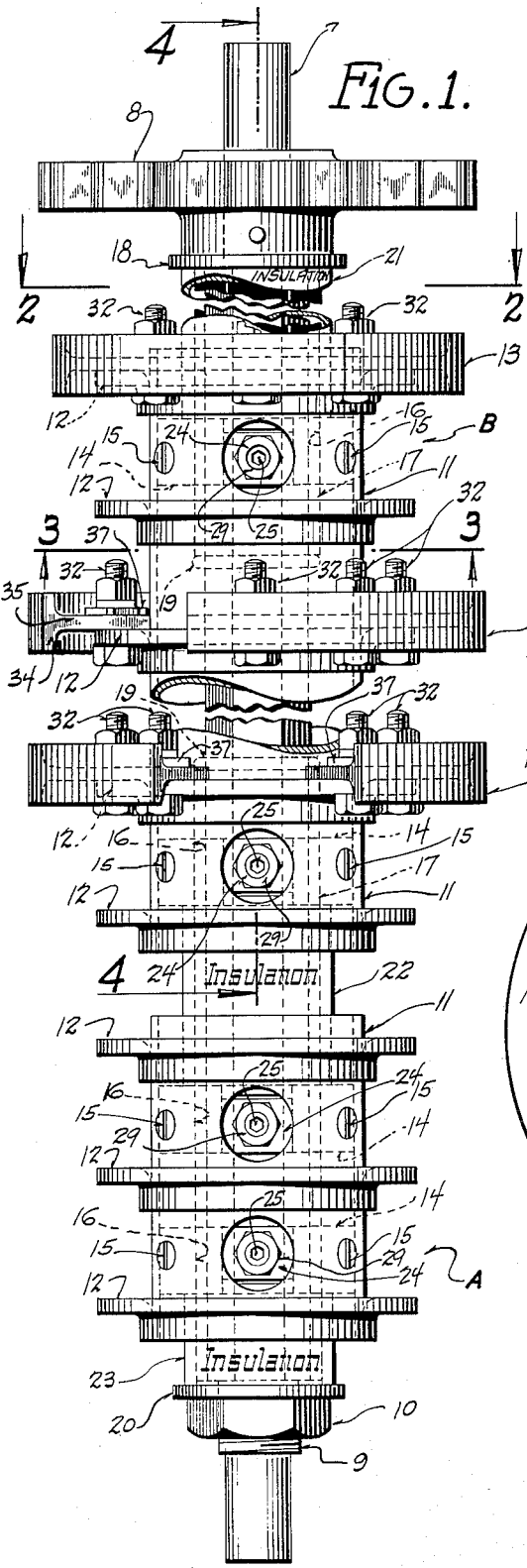
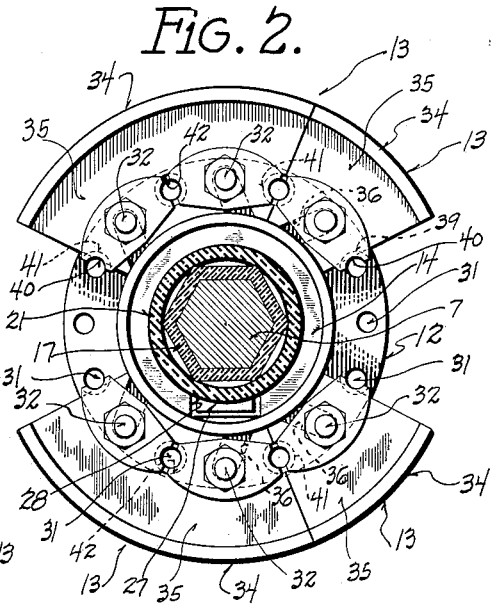
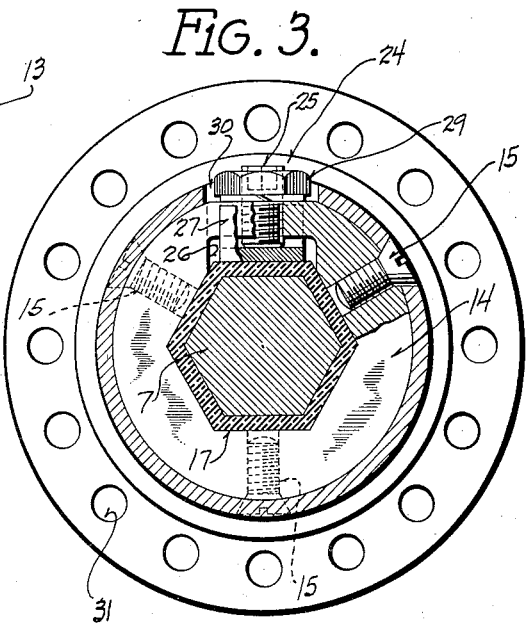
INVENTOR
Hans Petersen
BY Ira Milton Jones
ATTORNEY Aug. 1, 1933.     H. PETERSEN     1,920,431
DRUM CONTROLLER
Filed Dec. 26, 1930     2 Sheets-Sheet 2
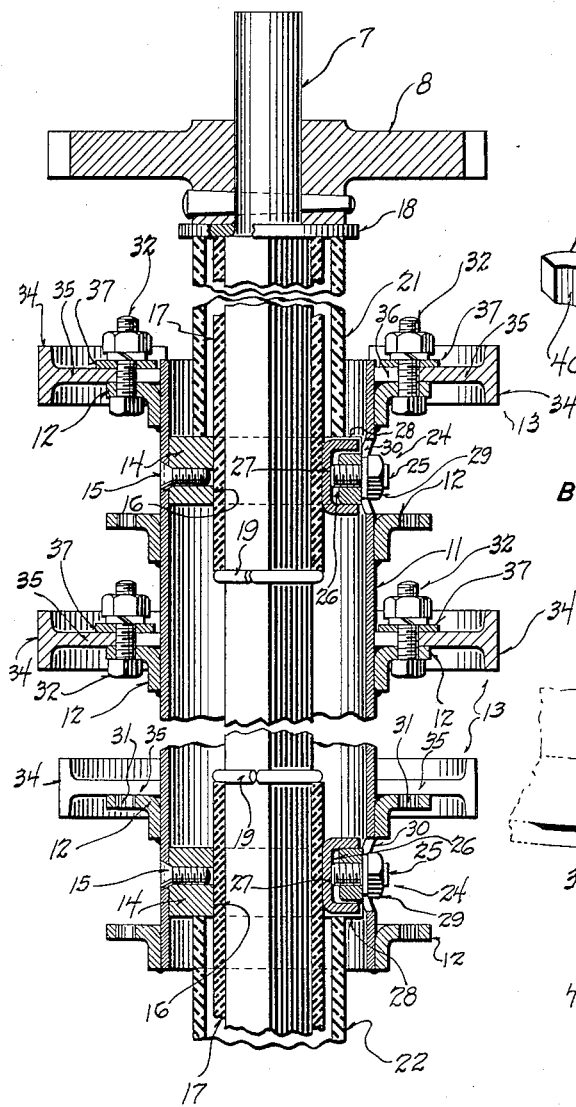
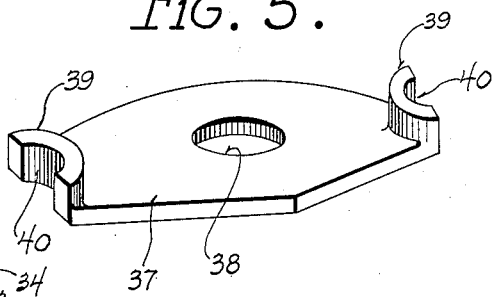
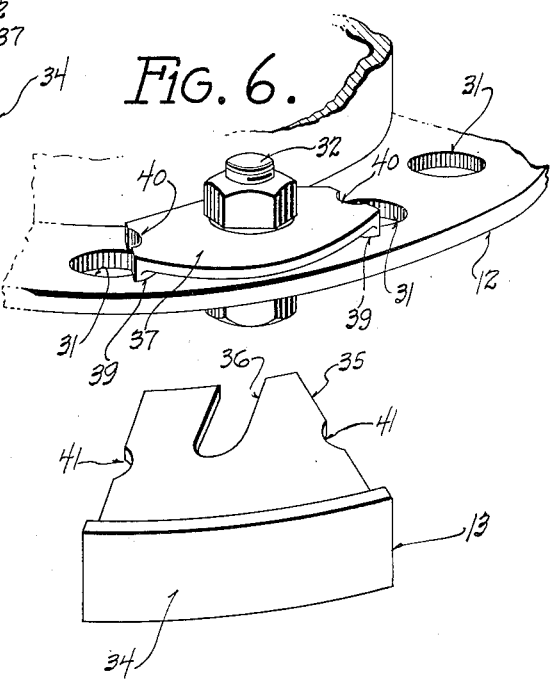
INVENTOR
Hans Petersen
BY Ira Milton Jones
ATTORNEY Patented Aug. 1, 1933

1,920,431

UNITED STATES PATENT OFFICE 1,920,431

DRUM CONTROLLER

Hans Petersen, Wauwatosa, Wis., assignor, by mesne assignments, to Allen-Bradley Company, Milwaukee, Wis., a Corporation of Wisconsin Application December 26, 1930
Serial No. 504,974

17 Claims. (Cl. 200—8)

This invention relates to certain new and useful improvements in drum controllers and refers more particularly to the mechanical construction of the drums per se and their contact segments.

It is an object of this invention to provide novel means for readily detachably securing the contact segments to their supporting structure.

Another object of this invention is to provide means for detachably connecting the contact segments with their supporting structure in such a manner that the replacement of removed segments in their proper positions is assured.

Another object of this invention resides in the provision of means permitting the segments to be mounted in any circumferentially adjusted position, so that any desired circuit combinations may be readily accommodated.

And a further object of this invention is to simplify the construction of drums of the character described and to materially reduce their cost of manufacture.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side elevation of a controller drum embodying my invention with portions thereof broken away;

Figure 2 is a cross sectional view taken through Figure 1 on the plane of the line 2—2;

Figure 3 is a cross sectional view taken through Figure 1 on the plane of the line 3—3;

Figure 4 is a longitudinal sectional view taken through Figure 1 on the plane of the line 4—4;

Figure 5 is a perspective view of one of the clamping plates which forms part of the means for detachably mounting the contact segments; and Figure 6 is a fragmentary perspective view of a portion of the drum and one of the segments shown detached therefrom and illustrating the manner in which the segments are readily detachably mounted.

Referring now more particularly to the accompanying drawings, in which like numerals designate like parts, the numeral 7 represents a central shaft on which the drum structure is mounted, the shaft being hexagonal in cross section throughout its major portion and cylindrical at its ends to permit the same to be journalled in a suitable mounting structure, not shown. At the upper end, the shaft 7 carries a star wheel 8 of conventional construction which is rigidly fixed thereto, and at its lower end, the shaft has a threaded portion 9 to receive a clamping nut 10 which cooperates with the star wheel to secure the drum structure assembled on the shaft and now about to be described, against longitudinal movement with respect to the shaft as will be later described.

The drum structure, which may be considered the contact segments and the means for mounting them from the shaft 7, is divided into electrically independent sections, any number of which may be assembled upon the shaft, and in the present instance one short section "A" and part of a long section "B" are shown mounted on the lower and upper portions of the shaft, respectively. Except for their size, and the distribution of their contact segments, the sections "A" and "B" are identical.

The drum sections, each comprise a tube 11 of greater diameter than the shaft, and on which collars or flanges 12 are secured at spaced intervals. The collars or flanges 12 provide means for attaching the drum contact segments indicated generally by the numeral 13, as will be later described, and may be fixed to the tube 11 in any desired manner. In the present instance they are welded at their lower portions, and while spot welding may be employed, the length of the tubes makes this method difficult.

The tubes 11 are mounted from the shaft by means of hubs 14, secured to the end portions of the tubes by screws 15. The hubs 14 have hexagonal openings 16 to receive not only the shaft, but also hexagonal insulating sleeves 17 secured over the shaft to insulate the tubes from the shaft.

The insulating sleeves are so situated and of such lengths, as to best accommodate the hubs of the tubes, and in the structure shown one extends downwardly from a washer 18 engaging the star wheel 8 to beneath the hub on the upper end of the adjacent tube 11, where it is held by a spring ring 19 disposed in an annular groove formed in the shaft. A second insulating sleeve 17 serves to insulate the hub at the lower end of the said tube 11 and the hubs of the lower section tube, from the shaft. This sleeve extends upwardly from a washer 20 engaging the nut 10 at the lower end of the shaft, beyond the lower section "A" to above the hub at the lower end of the upper tube 11, where a second spring ring 19 mounted on the shaft engages its end to prevent relative longitudinal movement between the sleeve and shaft.

To prevent longitudinal shifting of the drum sections without grounding them to the shaft or to each other, insulating spacing sleeves 21, 22, and 23 are disposed respectively between the top washer 18 and the adjacent hub 14 of the upper section "B", between the adjacent hubs 14 of the two sections, and between the lower washer 20 and the adjacent hub of the lower section "A". In this manner the entire structure is rigidly connected and held against longitudinal movement on the shaft.

Relative rotation between the shaft and the drum sections carried thereby is obviously prevented by the hexagonal shape of the shaft and the hub bores 16, and while for purposes of assembly a certain degree of play between the hub bores and the shaft is necessary, such slack is undesirable in the assembly structure and therefore means, indicated generally by the numeral 24, are provided to take up this play. This means consists of a hollow headed set screw 25 threaded in each hub 14 adjacent a recess 26 formed therein in communication with one flat side of its hexagonal bore, and which bears against the bottom of a U shaped clamping plate 27 received in the recess 26 to prevent marring of the insulating sleeves. The arms of the clamping plates embrace the sides of the hubs and on those sides of the hubs with which the spacing sleeves engage the arms of the U shaped clamping plates are received in depressions or recesses 28 forming continuations of the recesses 26. Accidental rotation of the set screws is prevented by suitable lock nuts 29, and to permit actuation of the set screws and lock nuts the sleeves 11 have openings 30 adjacent each locking device 24.

The collars or flanges 12 to which the contact segments 13 are attached, have circumferentially equally spaced holes 31 to reecive clamping bolts 32 by which the contact segments are readily detachably mounted on the flanges in a manner best illustrated in Figure 6. Each segment has an arcuate contact face 34, and a segmental web 35. The length of the contact face and the size of the web depends upon whether the segment is to extend through two, three or four positions of the drum, which in the present instance is shown as having seven positions. It is, of course, understood that the segments may be of any size and the drum may have any number of positions without deviating from the spirit of the invention.

Each segment also has one or more (depending upon the size of the segment) slots 36 in its web extending outwardly from the inner edge thereof, which, when the segments are in position with their inner edges abutting the outer peripheral surface of the tube 11 as shown in Figure 2, receive the clamping bolts 32.

The bolts 32 also serve to maintain clamping plates 37 assembled with the collars or flanges 12, between which and the flanges, the webs of the segments are disposed. As best illustrated in Figure 5, the clamping plates 37 have a central opening 38 to receive the bolts and have downwardly extended projections 39 at their ends.

Notches or recesses 40 are formed in the projections 39 wtih a radius equal to that of the opening 38, and the distance between the centers of the recesses 40 and a central opening 38 is equal to the distance between the holes 31 in the flanges 12. The length of the clamping plates thus bears a definite fixed relation to the spacing of the holes in the flanges 12 and the sizes of the segments are multiples of the space between the holes, so that they may be attached in any desired circumferential position.

The segments, when in position on their flanges 12 are held against rotation about the axis of their attaching or clamping bolts, in the case of the small two position segments, by the engagement of their inner ends with the outer cylindrical surface of the tube 11, and are held against outward movement, not only by the clamping action of the bolts, but also by the engagement of the downward projections 39 on the clamping plates 37 in suitable recesses 41 formed in the sides of the segment webs. In the larger segments where two clamping bolts and two plates 37 are used the projections 39 at the adjacent ends of the plates 37 are received in an opening 42 disposed medially of its two bolt slots 36, and the projections at the extreme ends of the plates engage notches 41 in the sides of the web as in the smaller segments.

Inasmuch as the clamping plates are securely held to the flanges 12, it follows that with the bolts 32 drawn tight loosening of the segments is impossible, but when it is desired to remove the segments it is only necesasry to back the nuts off their clamping bolts sufficiently far to enable their clamping plates to be lifted to disengage the projections 39 from the recesses in the webs. The plates 37, however, remain assembled with the flanges, so that the replacement of any segment in its proper place is assured.

It is noted that the slots 36 of the larger segments are parallel to permit the same to be engaged with and removed from their clamping means and that the slots of adjacent segments are so disposed as to permit any segment to be removed without disturbing the others.

For the sake of clearness and to more readily bring out the structure of the drum, the segments have been omitted from some of the collars or flanges 12 and it is understood that each collar or flange is adapted to carry one or more segments as the particular circuit arrangement for which the drum is designed may require.

From the foregoing description taken in connection with the accompanying drawings, it will be readily apparent to those skilled in the art to whch an invention of the character described appertains, that I provide novel means for attaching the contact segments of a drum controller to their supporting structure, whereby removal of any desired segment may be quickly accomplished and whereby the replacement of the segments in their proper positions is positively assured. It will also be apparent that the construction involved in this invention is exceptionally flexible and that any practical requirements may be easily met without changng the general design and without necessitating special parts.

What I claim as my invention is:

1. In a device of the character described, a cylindrical drum member having a plurality of means at axially and circumferentially spaced points for the attachment of independent contact segments, independent contact segments having portions adapted for engagement with the outer surface of the drum member and means engageable with any of the drum member carried means for mounting the segments on the drum member at selected locations defined by said drum member carried means and with said segment portions held in engagement with the outer cylindrical surface of the drum member.

2. In a device of the character described, a drum member having a plurality of circumferentially spaced means for the reception of attaching members, independent contact segments adapted to be mounted on the drum member, attaching members engageable with any of said circumferentially spaced means for mounting the segments on the drum member, and cooperating means carried by the segments and the attaching members for positively restraining movement of the segments when the attaching members are in operative condition and whereby partial release of the attaching member permits the ready removal of the segments.

3. In a device of the character described, a drum having means for the reception of an attaching member, a contact segment adapted to be mounted on the drum, an attaching member for clamping the segment to said drum carried means, said segment having an open slot to receive the attaching member so that the segment is engageable therewith by a straight line radial movement on the part of the segment, and cooperating means carried by the attaching member and the segment for positively preventing relative movement between the segment and the attaching member when the attaching member is in operative condition.

4. In a device of the character described, a drum member having means for the reception of a clamping bolt, a clamping bolt engaged with said means, a segment adapted to be mounted on the drum member by being clamped to a portion thereof by said clamping bolt, said segment having means whereby the same may be moved into and out of engagement with the drum when the clamping bolt is loosened a predetermined degree, and means whereby relative movement between the segment and the drum member is positively prevented when the clamping bolt is drawn tight.

5. In a device of the character described, a drum member having means for the reception of a clamping bolt, a clamping bolt engageable therewith, a contact segment adapted to be clamped to a portion of the drum member by said clamping bolt, said segment having a slot opening to one marginal edge thereof for the reception of said clamping bolt whereby the segment is engageable with and removable from its operative position on the drum member upon movement in a direction substantially parallel with said slot, and means for positively preventing relative movement of the segment with respect to the drum member when the clamping bolt is drawn tight.

6. In combination with a drum for electric controllers, contact segments, attaching means for detachably mounting the segments on the drum, and means whereby the segments may be detached without removing said attaching means, whereby the replacement of a detached segment in its proper position is assured.

7. In combination with a drum for electric controllers having means for the reception of clamping bolts, clamping bolts engageable with said means, independent segments adapted to be clamped to portions of the drum by said clamping bolts, means whereby the segments are readily movable to and from operative positions on the drum and engaged with the clamping bolts, and means whereby movement of the segments is positively prevented when the clamping bolts are drawn tight.

8. In a drum for electric controllers having a flange extended laterally therefrom, attaching members carried by the flange, independent contact segments adapted to be secured thereto by said attaching members, means whereby the contact segments are engageable with the attaching members when the attaching members are partially released, and means for positively preventing movement of the contact segments when the attaching members are in operative condition.

9. In a drum for electric controllers having an annular flange extending laterally therefrom, said flange being provided with circumferentially spaced openings for the reception of clamping bolts, clamping bolts in certain of said openings, independent contact segments adapted for engagement with the clamping bolts to be clamped to said flange by the bolts and thereby mounted on the drum, means whereby the contact segments are readily engageable with and detachable from the drum when the clamping bolts are partially released, and means whereby movement of the contact segments is positively prevented when the clamping bolts are drawn tight.

10. In a drum for electric controllers having an annular flange extended laterally therefrom, a clamping bolt carried by said flange, a clamping plate through which the bolt passes, a contact segment adapted to have a portion disposed between the clamping plate and the flange to be thereby clamped to the flange and mounted on the drum, said segment portion engageable between the flange and clamping plate having a slot opening to one marginal edge thereof whereby the segment may be readily engaged with and removed from its operative position when the clamping bolt is partially released, and cooperating means carried by the clamping plate and the segment for positively preventing movement on the part of the contact segment when the clamping bolt is drawn tight.

11. In a drum for electric controllers, an attaching flange carried by the drum, a clamping bolt connected with the attaching flange, a clamping plate maintained assembled with the flange by said bolt, a contact segment adapted to be clamped to said flange by having a portion disposed between said flange and the clamping plate, said contact segment portion having a slot for the reception of the clamping bolt whereby the segment may be engaged with and detached from the drum without removing the clamping bolt, and means carried by the clamping bolt and engageable in recesses in the said contact segment portion whereby movement of the contact segment with respect to the drum is positively prevented when the clamping bolt is drawn tight.

12. A drum for electric controllers comprising a central mounting shaft, a metal tube disposed over the shaft, means for rigidly securing the metal tube on the shaft against rotational and longitudinal movement, laterally extending annular flanges carried by the tube, independent contact segments, and means for readily detachably securing the contact segments to said annular flanges.

13. A drum for electric controllers comprising, a central mounting shaft, a metal tube surrounding the shaft and secured thereto, means carried by the tube for the reception of attaching members, independent contact segments adapted to be mounted on the tube, and attaching members engageable with said tube carried means for readily detachably mounting the contact segments on the tube.

14. A drum for electric controllers, comprising, a central mounting shaft, a metal tube encircling a portion of the shaft, means for securing the tube on the shaft, means for insulating the tube from the shaft, annular flanges carried by the tube, independent contact segments having portions engageable with the annular flanges and adapted to be mounted on the tube, and clamping bolts passing through said contact segment portions and the flanges for clamping the segments to the flanges.

15. A drum for electric controllers comprising, a central mounting shaft having a portion of polygonal cross section, a metal tube disposed over said portion of the shaft, hubs carried by the tube and providing openings corresponding to the cross sectional area of said polygonal portion of the shaft, insulating means disposed between the shaft and the hub openings to insulate the tube from the shaft, means carried by the hubs for clamping the same onto the shaft, and means on the exterior of the tube for readily detachably mounting a plurality of contact segments.

16. In a controller drum, a shaft, a member mounted on the shaft and insulated therefrom, said member having a curved surface substantially concentric to the shaft axis, a contact segment, and means for mounting the contact segment with spaced portions thereof and at opposite sides of the mounting means held in engagement with said curved surface, whereby the contact segment is held against movement about the mounting means.

17. In a controller drum, the combination of a shaft, a supporting plate carried by the shaft and extending outwardly therefrom, a contact segment comprising a substantially annular flange and an attaching web connected therewith and extending inwardly therefrom to have a flat engagement with said supporting plate, and means passing through the supporting plate and the web of the contact segment for detachably securing the contact segment to the supporting plate, said web being centrally disposed with respect to the annular flange so that the segment is substantially T shaped in cross section and symmetrical with respect to a plane extending through the center of the web and whereby the contact segment may be reversed and still retain a predetermined relative position with respect to the plane of the supporting plate with the web located at one side of the supporting plate.

HANS PETERSEN.